United States Patent [19]

Akkerman

[11] Patent Number: 4,602,061

[45] Date of Patent: Jul. 22, 1986

[54] LIQUID, 2-COMPONENT COATING COMPOSITION CURABLE AT AMBIENT TEMPERATURE COMPRISING A MALONATE COMPOUND AND AN UNSATURATED CARBONYL COMPOUND, AND THE MICHAEL ADDITION PRODUCT THEREOF

[75] Inventor: Jaap M. Akkerman, Haarlem, Netherlands

[73] Assignee: Akzo N.V., Arnhem, Netherlands

[21] Appl. No.: 716,273

[22] Filed: Mar. 26, 1985

[30] Foreign Application Priority Data

Mar. 29, 1984 [NL]  Netherlands ............... 8401007

[51] Int. Cl.$^4$ ............................................. C08G 63/02
[52] U.S. Cl. ...................................... 525/10; 525/425;
525/426; 525/428; 525/440; 525/444; 525/445;
525/530

[58] Field of Search ................. 525/10, 425, 426, 438,
525/440, 444, 445, 530

[56]  References Cited

FOREIGN PATENT DOCUMENTS 8401007  4/1952  Fed. Rep. of Germany .

Primary Examiner—Maurice J. Welsh
Attorney, Agent, or Firm—Jeffrey S. Boone

[57]  ABSTRACT

An ambient temperature curable composition is prepared from a $\alpha,\beta$-ethylenically unsaturated carbonyl compound (such as trimethylol propane triacrylate) and a compound chosen from a particular class of compounds having an activated CH group (such as malonate group-containing oligomeric or polymeric esters). The coatings of the invention cure quickly without heating, and have excellent hardness.

11 Claims, No Drawings

LIQUID, 2-COMPONENT COATING COMPOSITION CURABLE AT AMBIENT TEMPERATURE COMPRISING A MALONATE COMPOUND AND AN UNSATURATED CARBONYL COMPOUND, AND THE MICHAEL ADDITION PRODUCT THEREOF

BACKGROUND OF THE INVENTION

The invention relates to a liquid coating composition based on a compound containing an activated CH group and an $\alpha,\beta$-ethylenically unsaturated carbonyl compound.

A coating composition of the type indicated above is known from, int. al. German Patent Specification No. 835,809. As compounds containing an activated CH group, it proposes acetoacetates, acetoacetamides and cyanoacetates.

Examples of suitable $\alpha,\beta$-ethylenically unsaturated carbonyl compounds include acrylic or methacrylic esters or amides. In practice, however, it has been found that these well-known compositions can generally be insufficiently cured at room temperature and special steps must therefore be taken for the object coated with such a composition to be heated to the elevated temperature desired. This is a drawback, particularly in the case of, for instance, large steel structures.

It should also be noted that a coating composition based on an epoxy resin to be cured with a polyamine is curable at room temperature, but the resulting coatings display insufficient stability of gloss upon outdoor exposure. Further, compositions based on a polyisocyanate and a suitable hydroxy compound may cure at room temperature, but polyisocyanates may impair health, and can therefore be used only when taking special precautions.

SUMMARY OF THE INVENTION

The present invention provides compositions that can be used without taking special safety precautions (although normal safety precautions as are usual when working with these types of chemicals are necessary and should be observed), and can be easily cured at ambient or even lower temperatures to result in coatings that display favorable properties, such as gloss retention, hardness, and flexibility.

Briefly, the invention comprises a liquid coating composition based on a compound having an activated CH group and an $\alpha,\beta$-ethylenically unsaturated carbonyl compound, characterized in that the compound containing an activated CH group is a compound of the formula

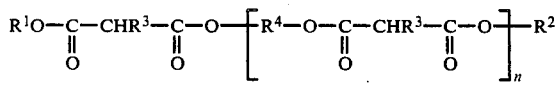

where $R^1$, $R^2$, and $R^4$ are independently chosen organic radicals; $R^3$ is an H atom, a group $R^5$, or a group of the formula $-CH^2$, $-CHR^6$, or $-COOR^5$; $R^5$ represents an alkyl group having 1-18 carbon atoms; $R^6$ represents an H atom or a methyl group; and n is at least 1, which compound has a molecular weight in the range of from 250 to 50,000.

DETAILED DESCRIPTION

Unless otherwise specified, the numerical ranges in the specification and claims are not critical. That is, they may be read as if prefaced by the word "about" or "substantially".

The compound according to the invention containing an activated CH group is referred to hereinafter as malonate compound.

As examples of suitable oligomeric or polymeric malonate compounds may be mentioned polyurethanes, polyesters, polyacrylates, epoxy resins, polyamides or polyvinyl resins containing malonate groups, either in the main chain or the side chain or in both.

Suitable malonate groups-containing polyurethanes may be obtained, for instance, by bringing a polyisocyanate into reaction with a hydroxyl group-containing ester of a polyol and malonic acid, by esterification or trans-esterification of a hydroxyfunctional polyurethane with malonic and/or a dialkyl malonate. Examples of suitable polyisocyanates include hexamethylene diisocyanate, isophorone diisocyanate, toluene diisocyanate and addition products of a polyol to a diisocyanate, such as that of tri-methylol propane to hexamethylene diisocyanate, isocyanurates obtained from 3 molecules of diisocyanate such as hexamethylene diisocyanate or isophoron diisocyanate, and biurets obtained from 3 molecules of diisocyanate such as hexamethylene diisocyanate and 1 molecule of water.

Examples of suitable hydroxyfunctional polyurethanes include the addition products of a polyisocyanate to di- or polyvalent hydroxy compounds, such as neopentyl glycol, dimethylol cyclohexane, trimethylol propane, 1,6-hexanediol and polyether polyols, polyester polyols or polyacrylate polyols.

Suitable malonic polyesters may be obtained, for instance, by polycondensation of malonic acid, an alkyl malonic acid, such as ethyl malonic acid, a mono- or dialkyl ester of such a carboxylic acid, or the reaction product of a malonic ester and an alkylacrylate or methacrylate, optionally mixed with other di- or polycarboxylic with one or more di- and/or higher functional hydroxy compounds, in combination or not with monofunctional hydroxy compounds and/or carboxyl compounds. Examples of suitable polyhydroxy compounds include compounds containing 2–6 hydroxyl group and 2-20 carbon atoms, such as ethylene glycol, diethylene glycol, propylene glycol, trimethylol ethane, trimethylol propane, glycerol, pentaerythritol and sorbitol.

Suitable malonate group-containing polymers also may be prepared by transesterification of an excess of dialkyl malonate with a hydroxy functional polymer, such as a vinyl alcohol-styrene copolymer. In this way, polymers with malonate groups in the side chains are formed. After the reaction, the excess of dialkyl malonate may optionally be removed under reduced pressure or be used as reactive solvent.

Suitable malonic epoxy esters may be prepared by esterifying an epoxy resin with malonic acid or a malonic monoester, or by transesterifying with a dialkyl malonate, optionally in the presence of one or more other carboxylic acids or derivatives thereof.

Suitable polyamides may be obtained in the same manner as polyesters, at least part of the hydroxy compound(s) being replaced with a mono- or polyvalent primary and/or secondary amine, such as cyclohexylamine, ethylene diamine, isophorone diamine, hexamethylene diamine, or diethylene triamine. The aboveenvisaged reactions are well known to one skilled in the art and need not be further described here.

Preferred malonate compounds are malonate group-containing oligomeric esters, polyesters, polyurethanes, or epoxy esters having 1-100, preferably 2-20 malonate groups per molecule. It is preferred that the malonate compounds should have a number average molecular weight in the range of from 250 to 30,000 and an acid number not higher than 5, preferably not higher than 2. Use may optionally be made of malonate compounds in which the malonic acid structural unit is cyclized by formaldehyde, acetaldehyde, acetone or cyclohexanone.

The $\alpha,\beta$-ethylenically unsaturated carbonyl compound to be used as second component may generally be any ethylenically unsaturated compound of which a carbon-carbon double bond is activated by a carbonyl group in the $\alpha$-position. Representative compounds of this group include acrylic or methacrylic esters of hydroxyl compounds having 1-6 OH groups and 1-20 carbon atoms. The esters may optionally contain hydroxyl groups. Examples of suitable esters include hexane diol diacrylate, trimethylol propane triacrylate and pentaerythritol triacrylate. Instead of or in addition to (meth)acrylic acid there may be used, for example: crotonic acid or cinnamic acid.

Another group of compounds includes the polyesters based on maleic acid or the anhydride thereof, fumaric acid and/or itaconic acid, a di- or polyvalent hydroxyl compound and, optionally, a monovalent hydroxyl and-/or carboxyl compound. Other suitable groups of compounds are acrylic acid groups-and/or methacrylic acid groups-containing polyester resins or alkyd resins. Examples of other suitable compounds include urethane (meth)acrylates obtained by reaction of a polyisocyanate with a free hydroxyl group-containing (meth)acrylic ester obtained by, for instance, esterification of a polyhydroxy compound with a less than stoichiometric amount of (meth)acrylic acid; polyether (meth)acrylates obtained by esterification of a hydroxyl groups-containing polyether with (meth)acrylic acid; polyfunctional (meth)acrylates obtained by reaction of a hydroxyalkyl (meth)acrylate with a dicarboxylic acid, with a glycidyl groups-containing compound or with an amino resin; poly(meth)acrylates obtained by reaction of (meth)acrylic acid or the anhydride thereof with an epoxy resin; the products obtained by reaction of a polycaprolactondi- or polyol with a polyisocyanate and with a hydroxyalkyl (meth)acrylate. All these types of compounds are known to one skilled in the art and need not be further described here. It is preferred that use should be made of an acrylic acid group- or methacrylic acid group-containing polyol ester, polyurethane, polyacrylate or amino resin having a functionality of 2-10 and an acid number not higher than 1.

The two afore-described components react with each other through a so-called Michael addition, in which the malonate anion of the first component is added to one of the carbon atoms of the ethylenically unsaturated group of the second component. The two components are preferably contained in the composition in a ratio such that the ratio of the number of malonate groups of the first component to the number of carbon-carbon double bonds of the second component is in the range of from ¼ to 4, preferably ½ to 2.

Although in the afore-mentioned description, there is reference to separate malonate compounds and $\alpha,\beta$-ethylenically unsaturated carbonyl compounds, the invention also permits the use of compounds with which the malonate group and the $\alpha,\beta$-ethylenically unsaturated carbonyl structural unit are present in one compound.

An illustrative compound may be obtained, for instance, by treating a hydroxylic malonic polyester with, for instance, a diisocyanate of which an isocyanate group has already reacted with a hydroxyalkyl (meth)acrylate. For instance, the polyester may be brought into reaction with the adduct of 1 mole of isokphoron diisocyanate and 1 mole of hydroxyethyl acrylate. The amounts of the starting compounds chosen are simply determinative of the ratio of malonate groups to the ethylenically unsaturated carbonyl groups.

The coating composition preferably also contains a catalyst for the reaction between the two afore-mentioned components or structural units. Suitable catalysts include electrically neutral bases such as amines and derivatives thereof. It is preferred that use should be made of a base of which the conjugated acid has a pKa of at least 12, such as amines of the amidine type, examples of which include tetramethyl guanidine, 1,4-dihydropyrimidines, 1,8-diaza-[5,4,0]-bicycloundecene, 2-allryl-N-alkylimidazoline. Amines such as triethylamine, dibutylamine, 1,4-diaza-[2,2,2]-bicyclo-octane do not catalyze the cross-linking reaction until a temperature of about 150° C. has been reached. Another class of suitable electrically neutral bases include non-noble metals such as lithium, sodium or potassium.

According to the invention, electrically charged bases also constitute suitable catalysts, provided that the conjugated acid thereof has a pKa of 5-45, preferably 9-19. As examples of representative bases may be mentioned metal bases and quaternary ammonium bases. Examples of suitable bases include metal oxides such as sodium methanolate; metal hydroxides such as potassium hydroxide; metal phenoxides such as sodium phenolate; metal hydrocarbon compounds such as n-butyllithium; metal hydrides such as sodium hydride; metal amides such as potassium amide; metal carbonates such as potassium carbonate; quaternary ammonium hydroxides such as tetrabutyl ammonium hydroxide; quaternary ammonium alkoxides such as benzyl trimethyl ammonium methoxide and quaternary ammonium carbanions such as benzyltrimethyl ammonium acetyl acetate.

The catalyst is generally contained in the composition in an amount of 0.1 to 10 equivalent percent, preferably ½ to 5 equivalent percent per equivalent malonate.

If desired, the action of the catalyst may be retarded or reduced by mixing it with a protic solvent having a pK of 5-14, preferably 9-11, such as acetyl acetone, acetyl butyrolactone, ethyl acetoacetate or dimethyl malonate.

Optionally and depending on the field of application selected, the coating composition may contain one or more pigments, dyes and usual intermediary agents, additives and solvents. Examples of suitable inert organic solvents include ketones, esters, aromatic and aliphatic hydrocarbons. Examples of suitable reactive organic solvents include dimethyl malonate, diethyl malonate, and 2-ethylhexyl acrylate.

The coating composition may be applied to the substrate in any convenient manner, for instance by brushing, sprinkling, spraying, or dipping. Suitable substrates include, for example, those of metals, wood, synthetic materials, paper, or leather. Curing the coating applied can be effected in a very suitable manner at a temperature of, for example, 0°–30° C. Optionally, use may be made of a curing temperature higher than 30° C., by which the curing time can be shortened.

PREPARATION OF MALONATE RESINS

A. In a reactor, a mixture of 495 parts by weight of 1,6-hexane diol, 503 parts by weight of dimethyl malonate, and 2 parts by weight of dibutyltin oxide are heated, with stirring and under a stream of nitrogen, to a temperature of 105° C., increasing to 200° C. Following the addition of 20 parts by weight of hexane, the remaining methanol was removed azeotropically. Subsequently, the temperature was decreased to 160° C. and 167 parts by weight of xylene were added to the resin obtained, as a result of which a 79.4% by weight resin solution having a viscosity of 650 mPa.s was obtained. The malonate resin "A" thus prepared had an acid number of 0.1, a hydroxyl number of 62, a number average molecular weight of 2450, and an equivalent weight of 250, calculated on the resin solution.

B. In a reactor, a mixture of 392 parts by weight of dimethyl cyclohexane, 110 parts by weight of trimethylol propane, 297 parts by weight of dimethyl malonate, 199 parts by weight of dimethyl hexahydroterephthalate, and 2 parts by weight of dibutyltin oxide was heated, with stirring and under a stream of nitrogen, to a temperature of 200° C. After 2 hours, 90 ml of hexane was added slowly, and the remaining methanol was removed azeotropically. Finally, the polycondensation mixture was subjected to vacuum distillation at 200° C. After cooling, 339 parts by weight of xylene was added to the resin, as a result of which a 69.0% by weight resin solution having a viscosity of 2100 mPa.s was obtained. The malonate resin "B" had an acid number of 0.23, a hydroxyl number of 110, a number of average molecular weight of 2150, and an equivalent weight of 503, calculated on the resin solution.

C. In a reactor, a mixture of 330 parts by weight of dimethyl malonate, 470 parts by weight of dimethylol cyclohexane, 35 parts by weight of trimethylol propane, 2 parts by weight of dibutyltin oxide, and 33 parts by weight of xylene was heated with stirring under a stream of nitrogen to a temperature of 200° C. After 2 hours, 55 parts by weight of xylene was slowly added and the remaining methanol was distilled off in 2 hours. After cooling, 173 parts by weight of 2-acetoxy-1-methoxy propane was added. Subsequently, 163 parts by weight of isophoron diisocyanate dissolved in 173 parts of xylene was added to the mixture over a period of 1 hour at 80° C., after which the reaction was continued for 1 hour at 100° C. After cooling, a 66% by weight resin solution was obtained having a viscosity of 4500 mPa.s. The malonate resin "C" had an acid number of 0.22, OH number of 65, a number average molecular of 2800, and an equivalent weight of 506, calculated on the resin solution.

D. In a reactor, a mixture of 194 parts by weight of dimethylol cyclohexane, 173 parts by weight of isophthalic acid, 109 parts by weight of trimethylol propane, 2 parts by weight of dibutyltin oxide and 27 parts by weight of xylene was heated with stirring under nitrogen, to a temperature of 200° C. After 2 hours, the mixture was cooled to 100° C. and 229 parts by weight of isophoron diamine and 329 parts by weight of dimethyl malonate were added, and the mixture was heated to a temperature of 200° C. After 2 hours, 56 parts by weight of xylene was added slowly, and the remaining methanol was distilled off in 2 hours. After cooling and subsequently adding 234 parts by weight of xylene and 234 parts by weight of 2-acetoxy-1-methoxy propane, a 60%-resin solution was obtained having a viscosity of 5100 mPa.s. The malonate resin "D" had an acid number of 0.56, an OH number of 85, a number average molecular weight of 1500, and an equivalent weight of 540, calculated on the resin solution.

EXAMPLE 1

A coating composition was prepared by successively mixing 10 parts by weight of the solution of malonate resin "A", 2 parts by weight of n-butanol, 0.2 parts by weight of a 40% by weight solution of benzyltrimethyl ammonium methoxide in methanol, and 4.2 parts by weight of trimethylol propane triacrylate. The resulting composition was applied to a steel panel (Bonder No. 120) in a coating thickness of 60 μm (after drying), after which the panel was kept at a temperature of 20° C. After 7 days, the coating had a Persoz hardness of 40 seconds. The composition obtained had a gel time of 5 minutes.

EXAMPLE 2

A coating composition was prepared by mixing successively 7.2 parts by weight of the solution of malonate resin "A", 0.15 parts by weight of a 40% by weight solution of benzyltrimethyl ammonium methoxide in methanol, and 19 parts by weight of the adduct of 1 mole of isopohoron diisocyanate and 2 moles of hydroxypropyl acrylate. The resulting composition was applied to a steel panel (Bonder No. 120) in a coating thickness of 60 μm (after drying); after 2 hours at 18° C., the coating had sufficiently cured (Persoz hardness of 70 seconds) and was resistant to solvents such as xylene and methylethyl ketone. The resulting composition had a gel time of 8 minutes.

EXAMPLE 3

A coating composition was prepared by mixing successively 0.5 parts by weight of acetyl acetone, 4.5 parts by weight of xylene, 0.1 part by weight of a 40% by weight solution of benzyltrimethyl ammonium methoxide in methanol, 15.9 parts by weight of the solution of malonate resin "B", and 3.0 parts by weight of trimethylol propane triacrylate. The resulting composition, which had a gel time of 30 hours, was applied to a steel panel (Bonder 120) in a coating thickness of 60 μm (after drying); after 7 days at a temperature of 20° C. the coating had sufficiently cured (Persoz hardness of 80 seconds) and was resistant to xylene and methylethyl ketone.

EXAMPLE 4

Example 3 was repeated, with the exception that the acetyl acetone and the benzyltrimethyl ammonium methoxide were collectively replaced by 0.22 parts by weight of tetramethyl guanidine. The composition, which had a gel time of 1 hour, gave a coating with identical properties.

EXAMPLE 5

Example 4 was repeated, with the exception that the tetramethyl guanidine was replaced either by 0.16 parts by weight of 1,4-diaza-[2,2,2]-bicycloisooctane (DABCO) or by 0.16 parts by weight of dibutyl amine. The compositions prepared had a gel time of over 3 months, and at at temperature of 180° C. they gave sufficiently cured coatings resistant to methylethyl ketone.

EXAMPLE 6

A coating composition was prepared by mixing successively 0.6 parts by weight of acetyl acetone, 0.22 parts by weight of a 40% by weight solution of benzyltrimethyl ammonium methoxide in methanol, 4.9 parts by weight of xylene, 20.0 parts by weight of the resin solution "C", and 5.1 parts by weight of trimethylol propane triacrylate. The composition obtained was stable for 2 hours and was applied to a steel panel (Bonder 120) in a coating thickness of 60 μm (after drying; after 7 days at a temperature of 20° C., the coating had sufficiently cured (Persoz hardness of 70 seconds) and was resistant to xylene and methylethyl ketone.

EXAMPLE 7

Example 6 was repeated, with the exception that the trimethylol propane triacrylate was replaced by 9.0 parts by weight of a 75% solution of the addition product of 1 mole of isophorone diisocyanate to 2 moles of pentaerythritol triacrylate.

The coating composition was stable for 4 hours, and was applied to a steel panel (Bonder 120) in a coating thickness of 60 μm (after drying). After 7 days at a temperature of 20° C., the coating and sufficiently cured (Persoz hardness of 200 seconds) and was resistant to xylene and methylethyl ketone.

I claim:

1. A liquid coating composition comprising a compound with an activated CH group and an $\alpha,\beta$-ethylenically unsaturated carbonyl compound, characterized in that the compound with an activated CH group is a compound of the formula

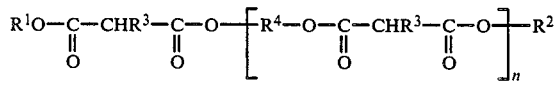

where $R^1$, $R^2$, and $R^4$ are independently chosen organic radicals; $R^3$ is an H atom, a group $R^5$, or a group of the formula $-CH^2$, $-CHR^6$, or $-COOR^5$; $R^5$ represents an alkyl group having 1-18 carbon atoms; $R^6$ represents an H atom or a methyl group; and n is at least 1, which compound has a molecular weight in the range of from 250 to 50,000.

2. The coating composition of claim 1, characterized in that the compound with an activated CH group is an oligomeric or polymeric malonate compound.

3. The coating composition of claim 2, characterized in that the malonate compound is a polyurethane, a polyester, a polyacrylate, an epoxy resin, a polyimide or a polyvinyl resin with malonate groups in the main and/or side chain.

4. The coating composition of claim 1, characterized in that the compound with an activated CH group is a malonate group-containing oligomeric ester, polyester, polymethane or epoxy-ester having 2-100 malonate groups per molecule.

5. The coating composition of claim 1, characterized in that the compound with an activated CH group has a number average molecular weight of 250–30,000 and an acid number not higher than 5.

6. The coating composition of claim 1, characterized in that there is also present a catalyst for the reaction between the compound with an activated CH group and the $\alpha,\beta$-ethylenically unsaturated carbonyl compound.

7. The coating composition of claim 6, characterized in that the catalyst is an electrically neutral base of which the conjugated acid has a pKa of at least 12.

8. The coating composition of claim 6, characterized in that the catalyst is an electrically charged base of which the conjugated acid has a pKa of 5–45.

9. The coating composition of claim 6, characterized in that the catalyst is present in an amount of 0.1 to 10 equivalent percent per equivalent of the compound with an activated CH group.

10. The coating composition of claim 7, characterized in that the catalyst is present in an amount of 0.1 to 10 equivalent percent per equivalent of the compound with an activated CH group.

11. The coating composition of claim 8, characterized in that the catalyst is present in an amount of 0.1 to 10 equivalent percent per equivalent of the compound with an activated CH group.

* * * * *

UNITED STATES PATENT AND TRADEMARK OFFICE
CERTIFICATE OF CORRECTION

PATENT NO. : 4,602,061

DATED : July 22, 1986

INVENTOR(S) : Jaap M. Akkerman

It is certified that error appears in the above—identified patent and that said Letters Patent is hereby corrected as shown below:

Column 1, line 64 and Column 7, line 45, change "$-CH^2$, $-CHR^6$, or $-COOR^5$;" to "$CH_2-CHR^6-COOR^5$;"

Signed and Sealed this

Seventh Day of April, 1987

Attest:

DONALD J. QUIGG

Attesting Officer

Commissioner of Patents and Trademarks